United States Patent
O'Shea

(10) Patent No.: US 12,316,392 B1
(45) Date of Patent: *May 27, 2025

(54) RADIO SIGNAL PROCESSING NETWORK MODEL SEARCH

(71) Applicant: DeepSig Inc., Arlington, VA (US)

(72) Inventor: Timothy James O'Shea, Arlington, VA (US)

(73) Assignee: DeepSig Inc., Arlington, VA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/646,868

(22) Filed: Apr. 26, 2024

Related U.S. Application Data

(63) Continuation of application No. 18/132,488, filed on Apr. 10, 2023, now Pat. No. 11,973,540, which is a
(Continued)

(51) Int. Cl.
*H04B 17/11* (2015.01)
*G06N 20/00* (2019.01)
(Continued)

(52) U.S. Cl.
CPC ............ *H04B 17/11* (2015.01); *G06N 20/00* (2019.01); *H04B 17/3912* (2015.01); *H04W 24/08* (2013.01)

(58) Field of Classification Search
CPC .. H04B 17/11; H04B 17/3912; H04B 17/309; H04B 17/318; H04B 17/21; H04B 17/26;
(Continued)

(56) References Cited

U.S. PATENT DOCUMENTS 9,313,166 B1   4/2016  Zeng
9,503,466 B2  11/2016  Vasseur et al.
(Continued)

FOREIGN PATENT DOCUMENTS

EP    3213105        5/2021
WO    WO 2015103514  7/2015
WO    WO 2018204632  11/2018

OTHER PUBLICATIONS

Aldossari, "Artificial Intelligence towards the Wireless Channel Modeling Communications in 5G," for the degree of Doctor of Philosophy, University of South Florida, College of Engineering, Apr. 2020, 160 pages.

(Continued)

*Primary Examiner* — Lana N Le

(74) *Attorney, Agent, or Firm* — Fish & Richardson P.C.

(57) ABSTRACT

Methods, systems, and apparatus, including computer programs encoded on computer storage media, for training and deploying machine-learned communication. One of the methods includes: receiving an RF signal at a signal processing system for training a machine-learning network; providing the RF signal through the machine-learning network; producing an output from the machine-learning network; measuring a distance metric between the signal processing model output and a reference model output; determining modifications to the machine-learning network to reduce the distance metric between the output and the reference model output; and in response to reducing the distance metric to a value that is less than or equal to a threshold value, determining a score of the trained machine-learning network using one or more other RF signals and one or more other corresponding reference model outputs, the score indicating an a performance metric of the trained machine-learning network to perform the desired RF function.

20 Claims, 9 Drawing Sheets

Related U.S. Application Data continuation of application No. 17/576,252, filed on Jan. 14, 2022, now Pat. No. 11,626,932, which is a continuation of application No. 16/017,952, filed on Jun. 25, 2018, now Pat. No. 11,228,379.

(60) Provisional application No. 62/523,866, filed on Jun. 23, 2017.

(51) Int. Cl.
*H04B 17/391* (2015.01)
*H04W 24/08* (2009.01)

(58) Field of Classification Search
CPC ...... H04B 17/24; H04B 17/29; H04B 17/373; H04B 17/336; H04B 17/3911; H04B 17/27; G06N 20/00; G06N 3/08; G06N 20/20; G06N 3/0454; G06N 3/0481; H04W 24/08; H04W 84/18; H04W 24/02; H04W 16/18; H04W 24/06; H04W 4/023; H04W 4/029

See application file for complete search history.

(56) References Cited

U.S. PATENT DOCUMENTS

| | | | |
|---|---|---|---|
| 9,560,060 B2 | 1/2017 | Baxley | |
| 10,097,284 B1 | 10/2018 | Kuan et al. | |
| 10,671,735 B2 | 6/2020 | Gupta et al. | |
| 10,862,207 B2 | 12/2020 | Vehovc et al. | |
| 10,998,101 B1 | 5/2021 | Tran et al. | |
| 11,074,107 B1 | 7/2021 | Nandakumar | |
| 11,228,379 B1 | 1/2022 | O'Shea et al. | |
| 11,580,325 B2 | 2/2023 | Perkins | |
| 11,626,932 B1 * | 4/2023 | O'Shea | G06N 20/00 |
| 11,973,540 B1 | 4/2024 | O'Shea | |
| 2011/0150113 A1 | 6/2011 | Oyman et al. | |
| 2012/0275538 A1 | 11/2012 | Kim | |
| 2015/0023562 A1 | 1/2015 | Moshfeghi | |
| 2015/0193693 A1 | 7/2015 | Vasseur et al. | |
| 2015/0341894 A1 | 11/2015 | Rowitch | |
| 2015/0349810 A1 | 12/2015 | Baxley et al. | |
| 2016/0224903 A1 * | 8/2016 | Talathi | G06N 3/045 |
| 2017/0061326 A1 | 3/2017 | Talathi et al. | |
| 2018/0019910 A1 | 1/2018 | Tsagkaris et al. | |
| 2019/0095785 A1 | 3/2019 | Sarkar et al. | |
| 2020/0322868 A1 | 10/2020 | Claffey et al. | |
| 2020/0405223 A1 | 12/2020 | Mai et al. | |
| 2021/0029248 A1 | 1/2021 | Scodary et al. | |
| 2021/0091866 A1 | 3/2021 | Zhang et al. | |
| 2021/0151123 A1 | 5/2021 | Araya et al. | |
| 2021/0295107 A1 | 9/2021 | Krishna et al. | |
| 2021/0399814 A1 * | 12/2021 | Qi | H04W 24/08 |
| 2022/0188700 A1 * | 6/2022 | Khavronin | G06N 20/00 |
| 2022/0272707 A1 * | 8/2022 | Thomas | H04W 28/04 |
| 2023/0353476 A1 | 11/2023 | Maurice | |
| 2024/0267756 A1 * | 8/2024 | Jafarian | H04W 24/08 |

OTHER PUBLICATIONS

Murray, Greg, "Deep learning detection in the visible and radio spectrums," 2022, Graduate Theses, Dissertations, and Problem Reports, 11186, 104 pages, URL <https://researchrepository.wvu.edu/etd/11186>.

* cited by examiner ized*

RADIO SIGNAL PROCESSING NETWORK MODEL SEARCH

CROSS-REFERENCE TO RELATED APPLICATION

This application is a continuation of U.S. application Ser. No. 18/132,488, filed Apr. 10, 2023, now allowed, which is a continuation of U.S. application Ser. No. 17/576,252, filed Jan. 14, 2022, now U.S. Pat. No. 11,626,932, which is a continuation of U.S. application Ser. No. 16/017,952, filed Jun. 25, 2018, now U.S. Pat. No. 11,228,379, which claims priority to U.S. Provisional Application No. 62/523,866, filed on Jun. 23, 2017. The disclosure of this prior applications are considered part of and is incorporated by reference in the disclosure of this application.

TECHNICAL FIELD

The present disclosure relates to machine-learning and deployment of adaptive wireless communications, and in particular to radio signal processing network model search.

BACKGROUND

Radio frequency (RF) waveforms are prevalent in many systems for communication, storage, sensing, measurements, and monitoring, among other uses. RF waveforms are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other forms of communication, such as through an internal system bus in a computer or through local or wide-area networks.

SUMMARY

In general, the subject matter of the present disclosure can be embodied in methods, apparatuses, and systems for training and deploying optimum machine-learning networks that can be utilized in RF processing systems. In particular, the machine-learning networks can be trained to determine an optimal signal processing system that simulates an RF environment.

In one aspect, a method is performed by one or more processors control processing of radio frequency (RF) signals using a machine-learning network. The method includes: receiving a first radio frequency (RF) signal at a signal processing system for training the machine-learning network included in the signal processing system to perform a desired RF function; providing the first RF signal through the machine-learning network at the signal processing system; producing a signal processing model output from the output of the machine-learning network; measuring a distance metric between the signal processing model output and a reference model output; determining one or more modifications to the machine-learning network to reduce the distance metric between the signal processing model output and the reference model output; and; and in response to reducing the distance metric to a value that is less than or equal to a threshold value, determining a score of the trained machine-learning network using one or more other RF signals and one or more other corresponding reference model outputs, the score indicating a performance metric of the trained machine-learning network to perform the desired RF function.

Particular implementations of the above aspect may include one or more of the following features. In some implementations, the first RF signal includes a sampled radio signal in at least one of a time domain, a frequency domain, a time-frequency spectrogram domain, or a wavelet domain representation.

In some implementations, determining the one or more modifications to the machine-learning network to reduce the distance metric between the signal processing model output and the reference model output further includes modifying one or more machine-learning operations in the machine-learning network by adding or removing machine-learning operations; and modifying one or more hyper-parameters within each of the one or more operations in the machine-learning network.

In some implementations, modifying the one or more machine-learning operations and modifying the one or more hyper-parameters further includes determining a first frequency rate for modifying the one or more machine-learning operations in the machine-learning network, the first frequency rate indicating how often to change the one or more machine-learning operations; determining a second frequency rate for modifying the one or more hyper-parameters within each of the one or more operations in the machine-learning network, the second frequency rate indicating how often to change the one or more hyper-parameters; and modifying the one or more machine-learning operations using the first frequency rate and modifying the one or more hyper-parameters using the second frequency rate until the distance metric is one of non-decreasing, less than the threshold value during the permutations, or equal to the threshold value during the permutations.

In some implementations, the method further includes determining the one or more modifications to the machine-learning network comprises maintaining one or more hyper-parameters during the training of the machine-learning network while determining one or more parameters during the training of the machine-learning network.

In some implementations, the hyper-parameters include at least one of a number of output values, a non-linear activation applied to the output, an input weight connectivity pattern, a dropout rate, a regularization parameter, a stochastic effect parameter, or an additive noise term for the machine-learning network.

In some implementations, the method further includes determining a second signal processing system that comprises a first distance metric to be less than or equal to the threshold value; retrieving one or more second hyper-parameters from the second signal processing system; retrieving one or more second operations from the second signal processing system; generating a new grouping of hyper-parameters that includes a combination of one or more of first hyper-parameters from the signal processing system and the second hyper-parameters from the second signal processing system; generating a new grouping of operations that includes a combination of one or more of first operations from the signal processing system and the second operations from the second signal processing system; determining a third signal processing system that includes the new grouping of the hyper-parameters and the new grouping of the operations; and determining a second distance metric of the third signal processing system by evaluating the third signal processing system with the desired RF function, wherein the second distance metric is less than or equal to the first distance metric from the second signal processing system.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions. The apparatuses may include a wireless router, a wireless access point, a cellular phone, a cellular base station, or a software radio.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
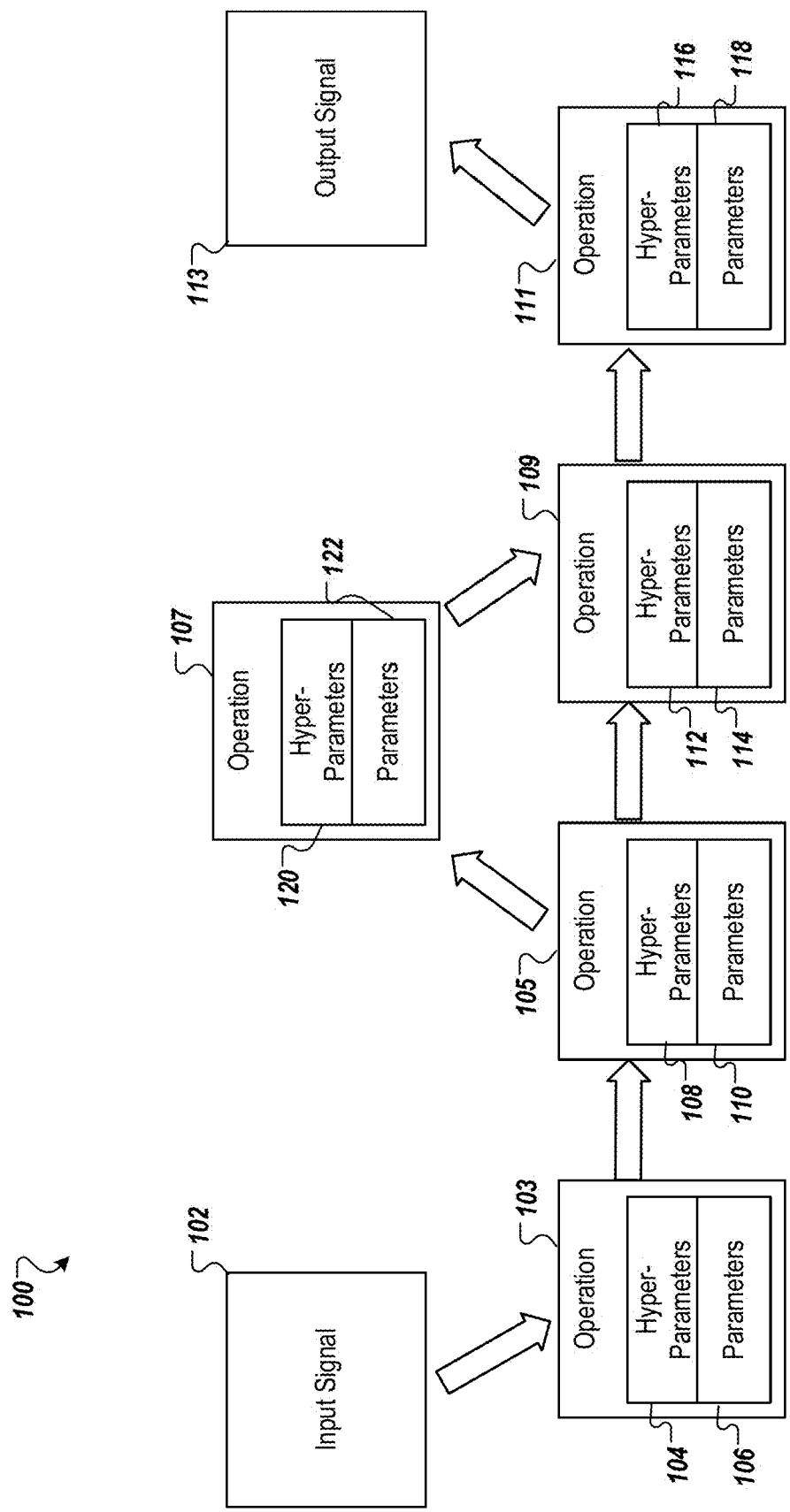
FIG. 1 illustrates an example of a radio signal processing system simulating a radio frequency (RF) environment.

This disclosure describes a learned radio signal processing system that is modeled to achieve target thresholds for performance metrics. In some implementations, the target thresholds for performance metrics include accuracy, error rates, or mean-squared error, or any combination of the three. In particular, the accuracy performance metric indicates how successful the learned radio signal processing system performs a function. For example, if the learned radio signal processing system is tasked with demodulating of a QPSK RF signal to retrieve information bits, the learned radio signal processing system is expected to meet a 90% accuracy threshold. Thus, 90% of the retrieved information bits should be correct. In another example, if the learned radio signal processing system is tasked with performing an analog-to-digital version, the learned radio signal processing system is expected to meet a 100% accuracy threshold, in which 100% of the analog samples are correctly converted to a digital representation. Ideally, the learned radio signal processing system may also seek to limit power consumption and operational cycles, among other parameters, while performing any radio signal processing tasks. The power consumption and complexity may often be related to which architecture or set of hyper-parameters are chosen, leading to the need for an effective means of architecture/hyper-parameter optimization, such as described below.

In some implementations, the radio signal processing system determines a computational network model by searching over a number of architectures and hyper-parameter sets. The determined computation network model can be the optimal model in terms of efficiency and minimizing power consumption. The optimal computational network model can receive a sampled radio input signal in time, frequency, spectral, or wavelet domain, or a set of information bits or code words. In response to receiving the sampled input, the optimal computational network model can simulate network impairments in an environment that experiences transmission signal impairment. For example, network impairments can include distortion, wireless channel effects, radio hardware effects, or bit errors. The optimal computational network model can output data indicating knowledge about modulation types, wireless radio types, radar types, wireless emission sources, reconstructed transmit information (bits, symbols, code words), other labels describing the input, regression values, or other pseudo-probabilities describing the input.

The present disclosure also describes a system and method for the creation and optimization of neural network radio signal processing models. In addition, the present disclosure describes an efficient method and system for searching over the numerous combinations of network architectures and hyper-parameter values for the parametric networks or neural networks to find the networks or model configurations which accomplish signal processing tasks with high accuracy, low error rates, minimal power consumption, minimal latency, low computational complexity, and/or trade-offs between these or other objectives.

The method can be applied to any sequence of signal processing algorithms, linear transforms, or nonlinear transforms that may be concatenated with varying dimensions or sets of parameters to form a system. The concatenation of the signal processing algorithms, linear and non-linear transforms derives principally from accuracy, error rate, cross-entropy, f-divergence, or other loss functions that is to be minimized or optimized in mapping an input dataset to an output dataset (which may be the same, in the case of an auto-encoder such as a wireless channel auto-encoder). This is an important design capability for designing any such data-centric signal processing system. This design capability is important because many architectures and hyper-parameter options exist that make it challenging to trade them all manually as an engineering design decision. The class of approximate data-centric signal processing systems is among the state of the art in both accuracy/error-rate performance as well as low complexity and power, making the present disclosure useful in optimizing such systems.

In some implementations, the disclosed system and method relies on an artificial intelligence or genetic search, particle swarm optimization, or otherwise intelligently directed search, to design a signal processing system that may use a number of parameters within another artificial intelligence system, network optimization, parametric linear or nonlinear transform, or neural network to constitute a signal processing system for streaming or batch processing data.

In some implementations, some radio signal processing systems include tightly couple artificial neural networks with radio hardware components to provide learned signal processing functions, which interface hardware devices with a collection of concurrent processing cores. These radio signal processing systems also share memory efficiently and improve performance on several tasks such as signal recognition, signal detection and estimation tasks, signal compression, signal pre-distortion and encoding for transmission and reception of radio signals using a loose network of tensor operations (e.g. vector adds, multiplies, exponentiations) involving a set of parameters such as weights or biases that may be combined with inputs or intermediate values to form outputs amongst a series of layers.

These radio signal processing systems include a network of sequential and/or concurrent vector (or tensor) operations on inputs, along with weights and linear or non-linear transformation to produce intermediate and output values, constitute a complex search space in which the vector sizes, data types, regularization methods used, operation widths, training batch sizes, learning rates, non-linearities applied to outputs of operations such as additions, multiplications, or other sequences of operations, operation dimensions, or operation parameters all impact the computational or error performance in terms of accuracy, error rate, cross-entropy, or similar loss function of the signal processing system.

Typically, these radio signal processing systems operate as close as possible to the input to output data mapping given by some dataset or through simulated datasets given by some analytic model for the world or the actual wireless propagation environment. This network could take the form of a sequence of arbitrary linear algebra operations that may or may not be parametric. In some cases, such as in parametric operations, these layers or intermediate operations may take the form of neural networks or self-normalizing neural networks. Within each possible graph of operations and dimensions constituting a single model, optimization of model parameters may be performed by a number of methods such as linear programs, iterative optimizers, gradient descent methods, or learned/modified gradient descent methods which tend to outperform traditional gradient descent solvers. In some implementations, the graph of operations can include a linear set of operations, a branching set of operations, merging, and concurrent operations.

In general, the network of operations performs the target signal processing task through the combination of mathematical operations defined within the model graph and hyper-parameter definition. Some possible instantiations of such a network include the use of fully connected neural network layers with various properties, self-normalizing neural network components, regularization components such as dropout or alpha-dropout, various types of layers with tied weights such as convolutional layers, or layers with other complex attention schemes that associate other weight patterns within the layer, or recurrent neural network layers such as long short-term memory (LSTM), gated recurrent unit (GRU), quasi-recurrent neural network (QRNN) or similar.

The model search process seeks to (i) minimize the number of operations required within the computation network to minimize the power consumption used by a realization of such a system, and also seeks to (ii) minimize the latency, processor, and memory requirements of such a system while trading off such computational requirements for accuracy and/or (iii) the accuracy or efficacy with which the mode can perform the given signal processing task after training (e.g., with stochastic gradient descent or similar methods). A trade-off exists between these objectives of such a model search system, and the model described in the present disclosure is able to optimize for either complexity, accuracy, or some joint combination of the two. Specifically, the model in the present disclosure seeks an optimal accuracy model which can be chosen given a limit on complexity, or a minimum complexity model that achieves a certain minimum desired accuracy level through this search process. The learned signal processing system or graph of operations performs a radio signal processing task while minimizing power consumption and/or number of operations, while maximizing a performance metric such as accuracy or mean-squared error. In some instances, the performance metrics which may be included in the score for an architecture such as latency, execution time, power consumption, number of operations, throughput, jewels per inference, etc may be measured on a specific target hardware device. For example, if the RF signal processing task is intended to run on a specific baseband mobile device, it may be evaluated on that device or on a simulator for that specific device when performing this search. Further examples of devices or device simulators which may be used for evaluation of model performance or efficiency may be a GPU, TPU, neuromorphic processor, embedded processor, DSP, laptop processor, FPGA, desktop processor, other digital logic device, or computing device. By optimizing directly on target devices, more optimal architecture, hyper-parameter, and parameter selections may be made to save power or improve inference performance specifically for the device, instruction set, and hardware-architecture chosen for the deployment of the machine-learning based signal processing model.

This system and method can rapidly search over a large number of architectures and hyper-parameter sets to obtain the best computational network or sequence of operations or neural network modules within a signal processing model or system that can be realized.

FIG. 1 illustrates an example of a radio signal processing system 100 simulating an RF environment. In some implementations, the radio signal processing system 100 includes input signal values 102, output signal values 113 and one or more operations 103 through 111. The radio signal processing system 100 can include one or more machine-learning networks. The input signal values 102 can include one or more radio signals from an antenna, sampled radio signals, one or more bits, and one or more bits of packet data. The output signal values 113 can include received radio bits or mapped information pertaining to the input.

In some implementations, the operations 103-111 of the machine-learning network can include one or more functions for constituting a radio signal processing algorithm. Each of the operations or architectures includes one or more values of hyper-parameters and values of parameters. For example, operation 103 includes hyper-parameters 104 and parameters 106; operation 105 includes hyper-parameters

108 and parameters 110; operation 107 includes hyper-parameters 120 and parameters 122; operation 109 includes hyper-parameters 112 and parameters 114; and operation 111 includes hyper-parameters 116 and parameters 118. Each of the hyper-parameters 104, 108, 112, 116, and 120 can include the following parameters described below.

Hyper-parameters are configuration variables of the machine-learning network that are set before the machine-learning network is trained. For example, the hyper-parameters can specify the structure of the machine-learning network, details of operations below, and how the machine-learning network is trained. For example, hyper-parameters can include the learning rate of a gradient descent which determines how quick the gradient updates follow the gradient direction, as well as strategies for learning rate modification during training. Another example of a hyper-parameter includes a loss function, such as a cross-entropy loss that compares the output of the machine-learning algorithm to a ground truth output during training. Another example of a hyper-parameter includes a mini-batch size for training. Another example of a hyper-parameter includes the number of training iterations or stopping criteria. The number of training iterations can be set by a user or auto-learned based on the number of training iterations determined from already trained machine-learning networks. In another example, the hyper-parameter can include momentum, which allows for smoothing the gradient during the gradient descent algorithm. Additionally, the hyper-parameter can also include a number of hidden units. For example, using all hidden layers or using a first hidden layer that is larger than the input layer. In another example, the hyper-parameters can include a weight decay parameter that helps the machine-learning network reduce overfitting during training. In another example, the hyper-parameters can include weight initialization which impacts the machine-learning network during training. In another example, the hyper-parameters can include a parameter for random seeds and model averaging that sets a seed for a random number generator used in the machine-learning network, or leverages weights from the training of prior model training processes in similar networks for initialization. In some implementations, each machine-learning network can be trained with multiple random seeds and use model averaging, such as Bayesian methods, for improved performance following training o the machine-learning network.

In some implementations, the parameters are configuration variables and internal to the machine-learning network whose values can be estimated and changed during training. The parameters can be estimated and learned during training, for example, through the use of stochastic gradient descent. For example, parameters of the machine-learning network can include the one or more weights or biases, vector values in a support vector machine, and one or more coefficients in a linear regression or logistical regression.

The operations 103-111 shown in the radio signal processing system 100 can include linear operations or nonlinear operations such as, large linear algebra vector operations performed over variables. The operations can additionally include graphs for viewing purposes that may be linear or sequential in nature or may have significant branching and merging of operations. Additionally, the graphs can allow a user to view each of the set hyper-parameters and watch as the hyper-parameters change over time. In many cases the operations can include may be acyclic or 'feed-forward.' In some implementations, the directed graphs of each operation may have cycles or lateral edges.

In some implementations, the radio signal processing system 100 includes an input signal 102 that includes radio samples (such as obtained from a radio antenna and analog to digital converter), or another intermediate radio communications signals such as symbols, bits, packets, or other intermediate signal processing values. The radio signal processing system 100 processes the received sampled RF data from the antenna through each of the operations 103 through 111 and outputs received radio bits or other information. For example, the received sampled RF data can include a carrier signal at 2.4 GHz and the radio signal processing system 100 can process the carrier signal down at baseband through each of the operations 103 to 111.

In other implementations, the radio signal processing system 100 receives an input signal 102 that includes sampled radio bits data from a stored database or from a processor. The radio signal processing system 100 processes the sampled radio bits through each of the operations 103 through 111. The operations 103 through 111 can simulate one or more RF environmental conditions, such as path-loss, distortion, and/or fading. The radio signal processing system 100 can output one or more variables that describe the input data in the output 113. For example, the one or more variables that describe the input data can include the arrival state of a signal such as the arrival time, frequency, channel impulse response, or other so called 'channel state information' (CSI). In some implementations, one of the operations, such as operation 111, can output a graph indicating an approximate estimator of CSI. In other implementations, the radio signal processing system 100 includes operations (e.g., operations 103 through 111) that are designed to mimic impairments of an environment when transmitting the input signal 102 wirelessly. For example, the impairments can include wireless channel errors, bit errors, or other stochastic impairments/distortions. The radio signal processing system 100 can receive information bits and output code words that are transformed within portions of the radio signal processing system 100 into different representations to be able to reconstruct the original input information at the output. In some implementations, the input signal 102 includes a sampled radio signal in its time domain, frequency domain, time-frequency spectrogram domain, wavelet domain, or a modified form, while the output includes information about what signals are present (e.g. modulation types, wireless radio types, radar types, wireless interference sources, impairment types occurring, etc.), or how they are arranged in the spectrum (e.g. their time, frequency, and mode of arrival). For example, the input signal 102 can includes an RF-modulated QPSK signal. The radio signal processing system 100 can demodulate the RF-modulated QPSK signal, process the signal, and output an indication that the signal includes QPSK modulation, path loss fading as an impairment, and arrival on the 2.4 GHz frequency.

Figure 2:
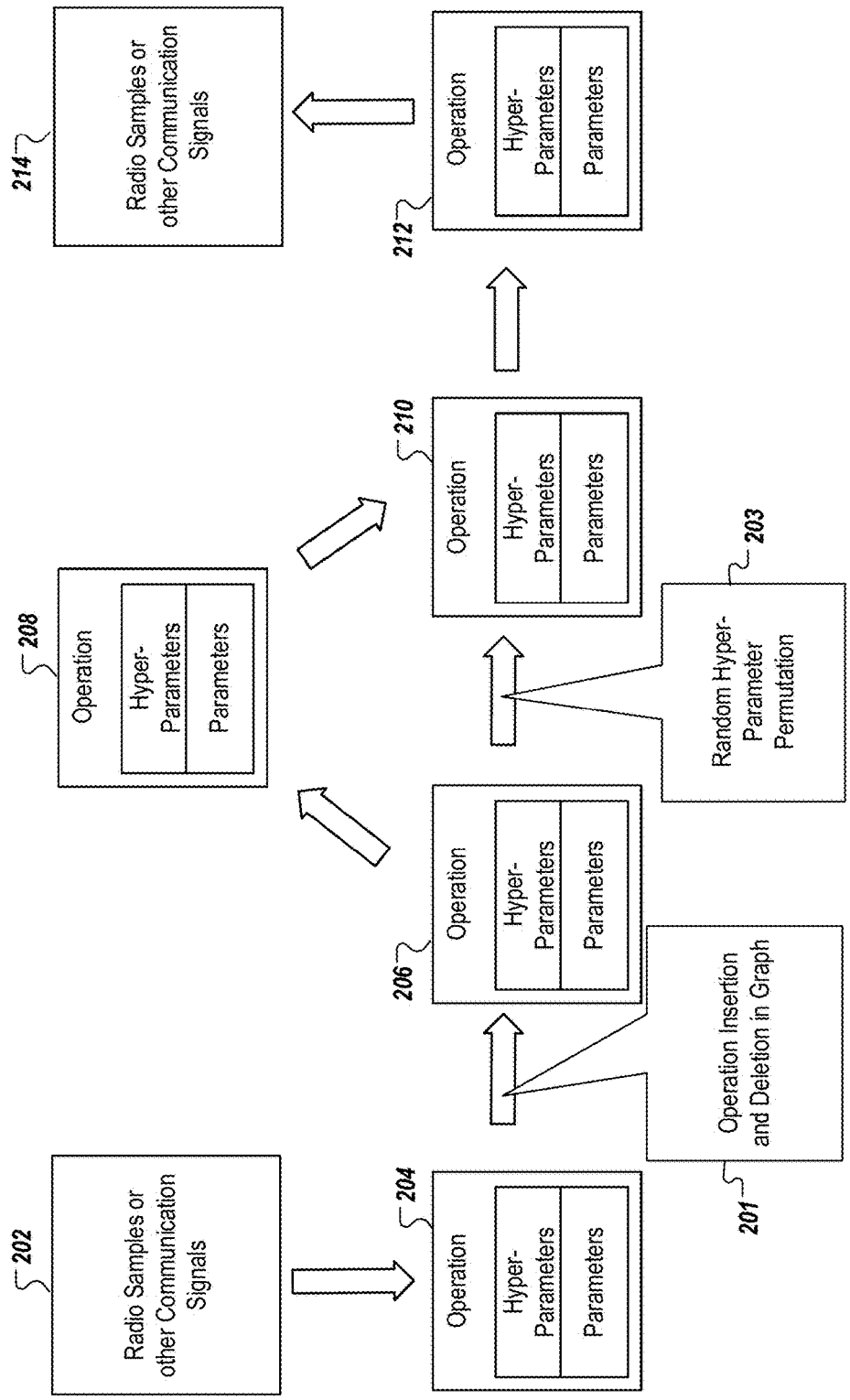
FIG. 2 illustrates an example of a radio signal processing system simulating an RF environment undergoing mutations.

FIG. 2 illustrates an example of a radio signal processing system 200 simulating an RF environment undergoing mutations. Radio signal processing system 200 includes radio samples input 202, radio samples output 214, and operations 204 through 212. Radio signal processing system 200 is similar to radio signal processing system 100. In some implementations, the radio signal processing system 200 is modified to form a new radio signal processing model. For instance, the radio signal processing system 200 includes operations 201 to insert and delete operations and random hyper-parameter permutation 203. In particular, the operation 201 to insert and delete operations randomly permutes the graph structure to add or remove operations, such as removing operations 204 and operation 206. If an operation is removed from the radio signal processing system 200, the connection is made between the operation to the left and to the right of the removed operation. The random hyper-parameter permutation 203 randomly changes the values of hyper-parameters within each operation to obtain a new radio signal processing system based on an old radio signal processing system. For example, the operations, such as the linear and non-linear transforms, can be removed and/or added to the radio signal processing system 200. In some implementations, the radio signal processing system 200 executed the operation 201 insert and delete and the random hyper-parameter permutation 203 to find a new mutated radio signal processing system 200.

In general, the machine-learning network can provide an input that generates a known output and compare the output to the known output. Each time the machine-learning network removes an operation using the operation 201 or permutes a hyper-parameter from the radio signal processing system 200, the machine-learning network can be trained using a dataset or data generating processing. Then, the machine-learning network can provide the same input into the updated radio signal processing system 200 to produce an output and determine a change from the previous output. For example, the machine-learning network can receive an RF signal with QPSK modulation as input and is known to produce an output of bits represented as "11100111." However, the current radio signal processing system 200 (e.g., machine-learning network) produces an output of bits represented as "00011000." The machine-learning network can execute the operation 201 and random hyper-parameter permutation 203 to improve the machine-learning network, by removing an operation or changing a hyper-parameter, iteratively, until the output reads bits represented as "11100111." Each time an operation or hyper-parameter is changed, the machine-learning network compares the output to the known output of bits represented as "11100111" to see if the machine-learning network has been improved or degraded.

The new instance of the radio signal processing system 200 has a similarity to the old instance of the radio signal processing system 200. However, the new radio signal processing system 200 includes the random permutations in operation structure and hyper-parameter values due to the mutation. The parameters in each of the operations remain unchanged, unless the operation itself is removed. In some implementations, a mutation rate can be chosen to define the probability that new operations are added or removed and the probability that hyper-parameters are changed. In some implementations, the mutation rate can vary over time. In some implementations, the machine-learning network can vary the number of operations and hyper-parameters in which are mutated. Additionally, the machine-learning network can vary how many operations and hyper-parameters are mutated at a time to improve the rate at which the radio signal processing system 200 improves over time. As such, a low mutation rate can be defined as a high similarity between the number and types of operations and hyper-parameters between the new radio signal processing model and the old radio signal processing model. In other implementations, a high mutation rate includes a lower similarity between the new radio signal processing model and the old radio signal processing model. When a lower similarity exists between the new and old radio signal processing models more permutations have occurred on the operation and hyper-parameter values.

Figure 3:
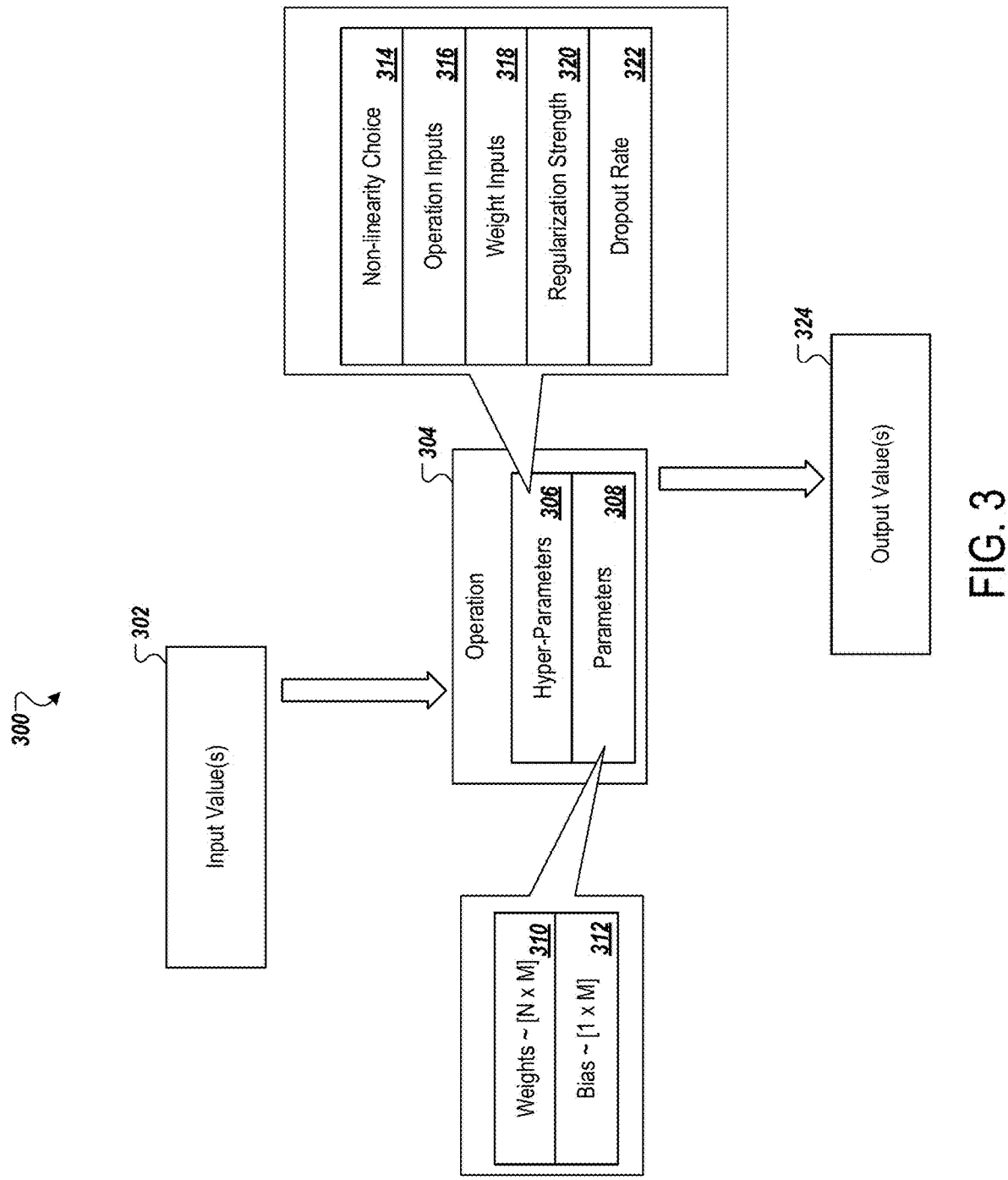
FIG. 3 illustrates an example of an input/output operation of a radio signal processing system.

FIG. 3 illustrates an example of an input/output operation 300 of a radio signal processing system that shows some input, output, parameters and hyper-parameters. In particular, an operation 304 can include a generic linear algebra operation, a vector instruction, an optimized computational kernel or a layer with one or more neurons, such as a layer used in a neural network. In general, each operation in the radio signal processing system, such as operation 304 acts on the input value(s) 111 and produces an output value(s) 112. In particular, the operation 304 includes a mapping of multiplications and additions between the input value(s) 302 and the parameters (103).

In some implementations, each operation, such as operation 306 include hyper-parameters 306. The hyper-parameters 306 define a number of properties of the operation 304. For example, the hyper-parameters 306 can include the number of outputs values, the non-linear activation applied to the output, an input/weight connectivity pattern (106), a name and expression forming the operation; and a regularization strength, such as a dropout rate or additive noise term. Additionally, the hyper-parameters 306 can include non-linearity choice inputs 314 such as linear inputs, non-linear inputs, a rectified linear unit, a sigmoid function, a hyperbolic tangent function, a Softmax function, and a scaled exponential linear unit function. The hyper-parameters 306 can include operation inputs 316 such as width of operation and a number of intermediate values. The hyper parameters 306 can include weight inputs 318 such as from the input/weight connectivity pattern. The weight inputs 318 can include-convolutional, dense, or a dilated convolution, such as an atrous convolution. In some implementations, the parameters 308 take the form of arrays or vectors of numbers such as floating-point values, fixed point values, or integers making up a weight vector 310 or a bias vector 312. For example, the weight vector 310 can be of size N×M and can be used for scaling activations multiplicatively and the bias vector 312 can be used for adding to the activations in the radio signal processing model. The bias vector 312 can be a one-dimensional vector with M number of values. Weight and bias vectors may take on different shapes for different layer configurations, layer types, strides, filter shapes, etc.

The hyper-parameters 306 are fixed during the training of a radio signal processing model while the parameters 308 are optimized through some sequence of optimization steps. In particular, the hyper-parameters remain constant during training of the radio signal processing model 200 while the parameters 308 are actively changed or permuted until the parameters 308 reach a threshold value. Once the parameters 308 meet or exceed the threshold value, the parameters 308 are deemed to be optimized. The training process for one model may perform many iteration updates on each operation (e.g. through back-propagation or gradient descent) or each hyper-parameter to obtain a good model performance of the radio signal processing model. This will be further described in FIG. 5 by the minimal loss function 504 or by the use of a non-iterative optimization method.

Figure 4:
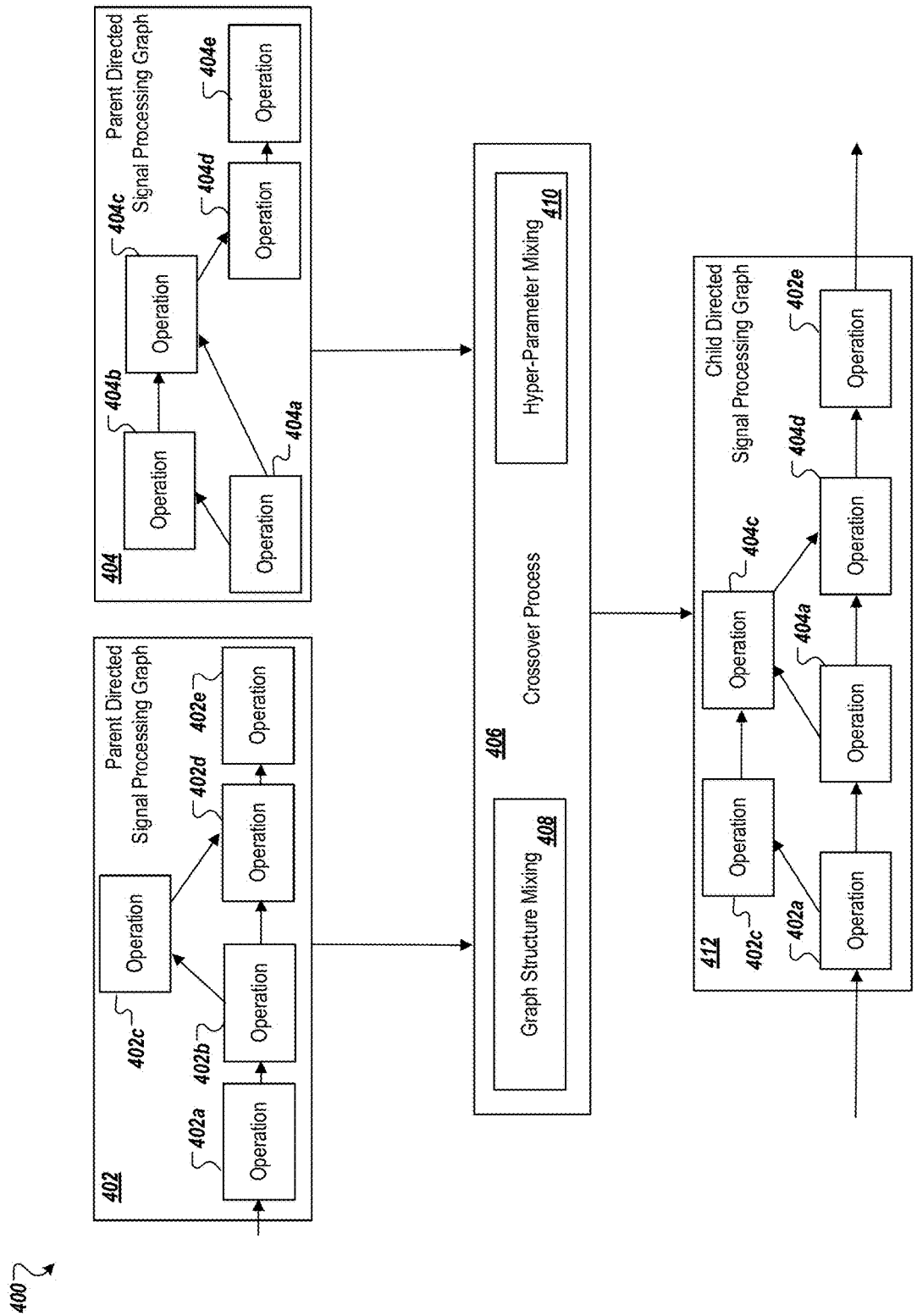
FIG. 4 illustrates an example of a crossover procedure of a radio signal processing system.

FIG. 4 illustrates an example of a crossover procedure 406 of a radio signal processing system 400. In particular, the radio signal processing system 400 includes two parent directed radio signal processing systems 402 and 404. Radio signal processing system 402 has a different structure, different operations, different connections, parameters, and hyper-parameters from radio signal processing system 404. For instance, radio signal processing system 402 has operations 402a through 402e. Additionally, radio signal processing system 404 has operations 404a through 404e. The radio signal processing system 400 includes a crossover process 406 by which portions of the radio signal processing system 402 and portions of the radio signal processing system 404 are combined to form a new radio signal processing model 412.

In some implementations, radio signal processing system 402 and radio signal processing system 404 have been trained to have met a distance threshold, such that these systems were deemed to be performing in an optimal range. For example, as further described below with respect to FIG. 5, radio signal processing system 402 and radio signal processing system 404 each include a low final average distance metric. In this instance, the radio signal processing model 402 and the radio signal processing model 404 are combined to form a radio signal processing model 412 that includes operations, hyper-parameters, and sub-graphs from each of the parent radio signal processing models (e.g., 402 and 404) in an attempt to form a new model which also has a low final average distance metric. In some implementations, the radio signal processing system 412 will include a lower final average distance metric than the radio signal processing systems 402 and 404.

In some implementations, the crossover process 406 includes one or more machine-learning networks that perform graph structure mixing 408 and hyper-parameter mixing 410. In particular, during the crossover process 406, portions of the radio signal processing system 402 are mixed with portions of radio signal processing system 404. For example, operations 402a, 402b, and 402c may be mixed with operations 404b, 404d, and 404e. The crossover process 406 mixes operations 402a, 402b, 402c, 404b, 404d, and 404e to generate a new radio signal processing system. Additionally, the crossover process 406 also incorporates hyper-parameter mixing 410 in which hyper parameters from the radio signal processing system 402 and radio signal processing system 404 are combined together to form new operations with different hyper-parameters. The new radio signal processing system is then evaluated with a known input and output signal to determine whether the new radio signal processing system includes a lower final average distance metric than the radio signal processing systems 402 and 404. If the new radio signal processing system does not produce a lower final average distance metric, then the crossover process 406 executes the graph structure mixing 408 and hyper-parameter mixing 410 again.

In some implementations, the crossover process 406 may retrieve from many more than two parent radio signal processing systems, or may randomly select two from a plurality of prior systems. Currently, two are shown for illustrative purposes. In other implementations, the crossover process 406 may retrieve graph structures from previous promising candidate architectures/hyper-parameter sets known in parent radio signal processing systems. As illustrated in FIG. 4, the optimal radio signal processing system 412 includes operation 402a, 402c, 404a, 404c, 404d, and 402e.

Figure 5:
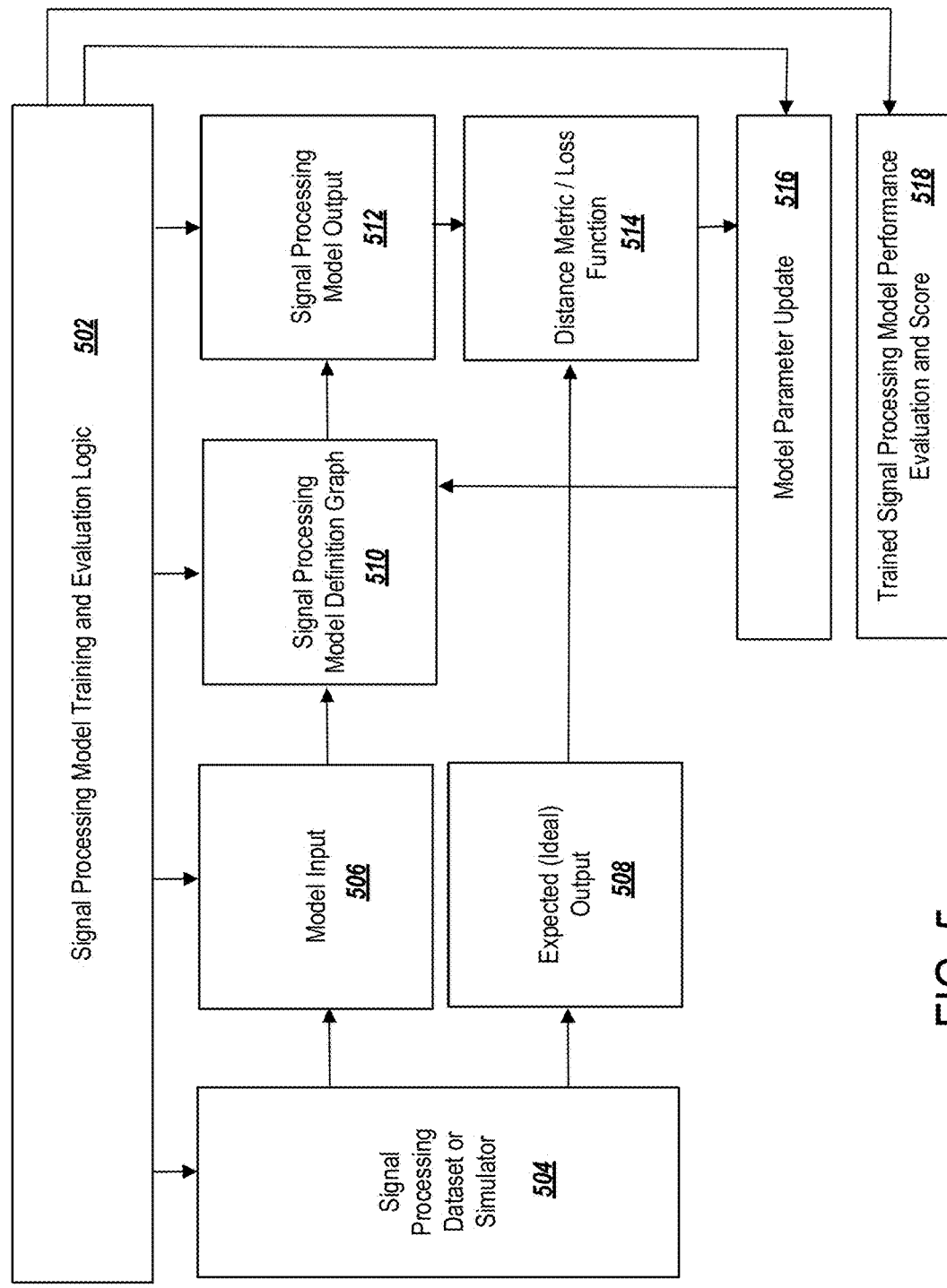
FIG. 5 illustrates an example of a network training module of a radio signal processing system.

FIG. 5 illustrates an example of a network training module search 500 in a radio signal processing system. In some implementations, the network training module search 500 includes a signal processing model training and evaluation logic 502, signal processing dataset or simulator 504, model input 506, expected (ideal) output 508, signal processing model definition graph 510, signal processing model output 512, distance metric/loss function 514, model parameter update 516, and trained signal processing model performance evaluation and score 518.

In some implementations, the signal processing model definition graph 510 can include an architecture of the radio signal processing system. For example, for radio signal processing system 200, the signal processing model definition graph 510 can include the number of operations, the connections between each of the operations, the set of hyper-parameters in the radio signal processing system.

In some implementations, the network training module search 500 includes a set of signal processing (SP) model training and evaluation logic 502. The SP model training and evaluation logic 502 controls the execution of the signal processing model definition graph 510. For example, the SP model training and evaluation logic 502 controls the flow of data from the model input 506 to each of the operations in the SP model definition graph 510 to the signal processing model output 512.

In some implementations, a SP dataset or simulator 504 produces a model input 506. For example, the SP dataset or simulator 504 produces sampled input radio signals, symbols, information bits, packet data or other communication data to provide as model input 506.

In some implementations, the network training module search 500 includes an SP model output 512. The SP model output 512 produces an output that can include, for example, labels, information bits, output information, and other output flagged data from the corresponding model input 506.

In some implementations, the network training module search 500 includes a distance metric/loss function 514. The distance metric/loss function 514 computes the distance between the expected (ideal) output 508 and the signal processing model output 512. For example, the distance between the expected output 508 and the signal processing model output 512 can indicate an error rate of the signal processing model definition graph 510. Additionally, the error rate from the distance metric/loss function 514 can indicate a number of iterations and/or updates to the operations and hyper-parameters of the signal processing model definition graph 510.

In some implementations, the SP model training and evaluation logic 502 executes many model parameter updates 516 which updates the parameters in the signal processing model definition 510 to reduce the distance metric 514. In some implementations, the frequency with which the updates are performed may be increased until the distance metric reaches a threshold value. In other implementations, the frequency with which the updates are performed may remain constant until the distance metric reaches the threshold value. In particular, the SP model training and evaluation logic 502 updates the hyper-parameters and the operations of the signal processing model definition graph 510, the distance metric/loss function 514, and the signal processing model parameter update 516 iteratively for a number of iterations until the distance metric/loss function 514 becomes stable and will not reduce further. In particular, the distance metric/loss function 514 becoming stable means that a value of the distance metric/loss function 514 meets or falls below a threshold value. Additionally, when the value of the distance metric/loss function 514 no longer decreases after the number of iterations, the iterations are complete.

In some implementations, once this cycle of training has completed, the signal processing model definition graph 510 may be evaluated for its final performance. For example, the signal processing model definition graph 510 being evaluated for its final task includes processing some other radio signal, such as OFDM, and determining whether the correct bit information has been processed and retrieved from the OFDM signal.

In some implementations, the trained signal processing model performance evaluation and scoring 518 occurs by computing the distance metric 514 or another metric. For example, the trained signal processing model performance evaluation and scoring 518 can determine a classification accuracy on a dataset from the model input 506 or a portion of a dataset 506. For instance, the training SP model performance evaluation and score 518 may determine whether the trained signal processing model produces the correct label, the correct transmission, or the correct bit stream output. Different datasets may be used for training and evaluation in many cases or the same. After the trained signal processing model performance evaluation and score 518 completes, the output score from this module provides an indication as to the strength of the signal processing model definition graph 510. For example, if the trained signal processing model performance evaluation and score 518 produce a score of 100 (e.g., an accuracy percentage) for the signal processing model definition graph 510, then the signal processing model definition graph 510 is at a maximum. Likewise, if the score is 10, then the signal processing model definition graph 510 includes a poor performance.

Figure 6:
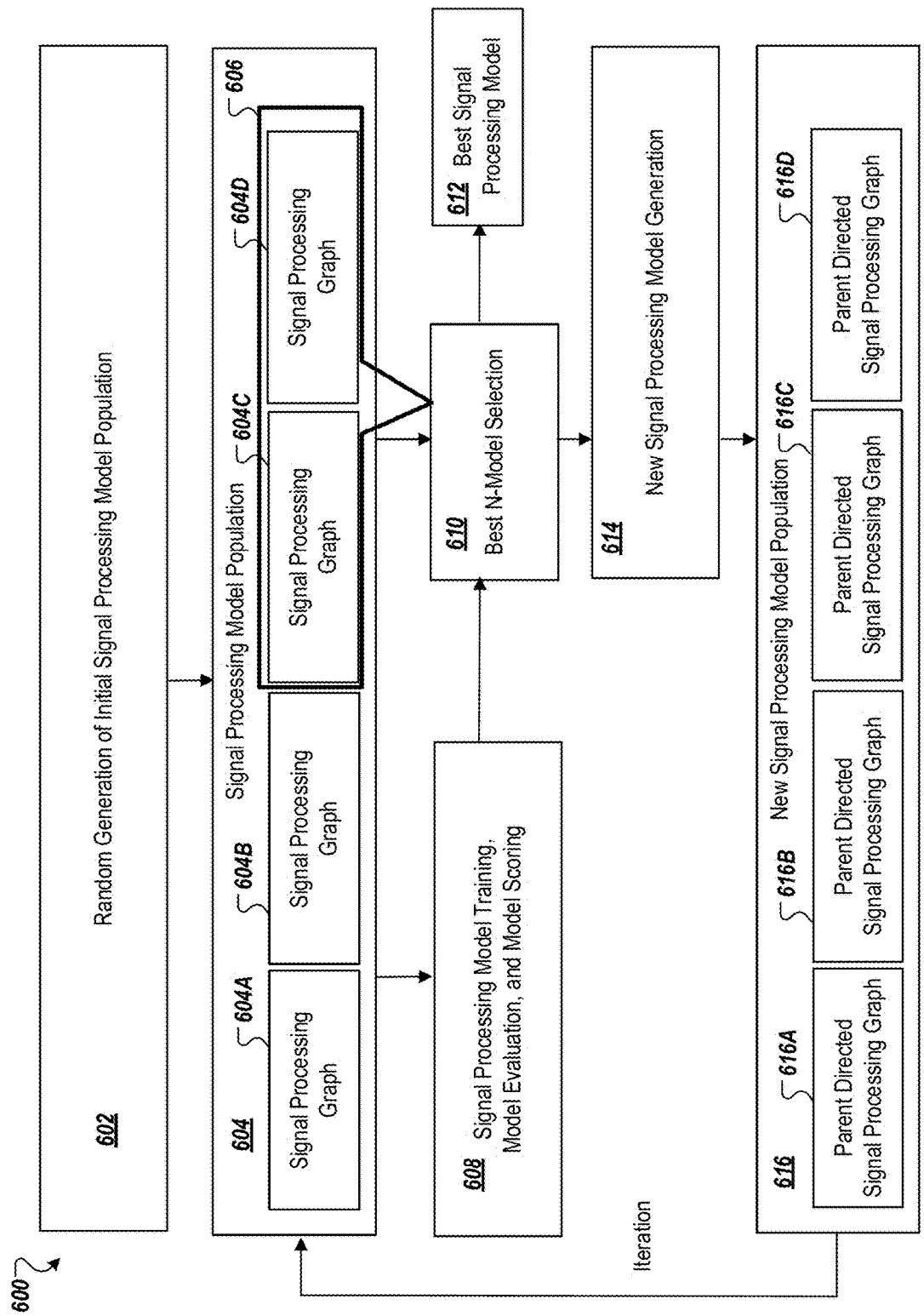
FIG. 6 illustrates an example of a signal processing model search in a radio signal processing system.

FIG. 6 illustrates an example of a signal processing model search 600 in a radio signal processing system for radio signal processing ("S. P.") tasks. In particular, the signal processing model search 600 initiates with a random generation of the initial signal processing model population 602. As described in FIG. 2, the random generation of initial signal processing model population 600 mutates a radio signal processing system, such as radio signal processing system 602. For example, the mutations can occur removing and/or adding one or more operations and changing the hyper-parameters of the radio signal processing system, such as described in operation 201 and random hyper-parameter permutation 203.

The random generation of initial signal processing model population 602 operates on a radio signal processing system, such as radio signal processing system 600, to produce a set of signal processing models ("SP Model Population") 604. The SP model population 604 includes a signal processing graph 604A, signal processing graph 604B, signal processing graph 604C, and signal processing graph 604D. The SP model population 604 includes a collection of possible one or more signal processing models 604 to solve a signal processing task. For example, a signal processing task can include translating a sample radio time signal (e.g. by an analog to digital converter device) from one form to another form, such as symbols, class labels, compressed signal, or another kind of signal. In another example, the signal processing task can include moving a sampled RF carrier signal from its carrier frequency to baseband frequency to be further processed. In these cases, a task can be defined as a radio signal processing function, such as taking in radio sample data to convert using an analog to digital converter, or from moving a carrier signal down to baseband, or from another signal processing algorithm, and producing a different form of the input data.

In some implementations, the different form of the input data can include one or more various types of data. For example, the different form of the input data can be bits recovered from a radio signal. In another example, the input data can be a timing estimate or other channel state estimate from the signal. In another example, the input data can be pilot symbol data that allows the signal processing models to lock on to input signals for further processing. When performing the radio signal processing function in the most efficient manner while consuming the least amount of power, the optimum hyper-parameters and operations need to be determined. The signal processing model search 600 initiates a process of iteration to determine the optimum operations and hyper-parameters that allows the radio signal processing function to be performed in the most efficient manner while minimizing power loss. During the process of iteration, the SP model population 604 is trained, evaluated, and scored using the signal processing model training, model evaluation, and model scoring 608 to produce a distance metric that meets or falls below a threshold value. For example, the signal processing model training, model evaluation, and model scoring 608 trains using gradient descent and scores the SP model population 604 using a distance metric measurement, as described in FIG. 5.

In some implementations, the signal processing model search 600 then initiates the best n-model selection 610. In particular, the best n-model selection 610 selects the signal processing model(s) from the SP model population 604 with the best model scores to be used to seed the next generation. For example, the signal processing models with the best model scores include the signal processing models with the lowest distance function for a radio signal processing function. As shown in FIG. 6, the best signal processing models 606 include signal processing model 604C and signal processing model 604D. In response, the new signal processing model generation 614 utilizes the graph structure mixing and the hyper-parameter mixing in the cross over process described in FIG. 4 from signal processing model 604C and signal processing model 604D to produce a new signal processing model population 616. In particular, the new signal processing model population 616 is similar to the selected best models 606 but also includes the random permutations of hyper-parameters and operations.

The signal processing model search 600 continues the iteration process by replacing the signal processing model population 604 with the new signal processing model population 616 and repeating the steps performed by the signal processing model training, model evaluation, and model scoring 608, best n-model selection 610, and new signal processing model generation 614, until no further improvements can be achieved in the best models. In some examples, no further improvements can be achieved in the best models when the distance metric for the best metric no longer decreases or reaches or falls below a threshold value. At this point, the best signal processing model 612 is chosen with the best distance metric score that can perform the radio signal processing function most efficiently. For example, the radio signal processing model that can perform the most efficiently includes the lowest error rate, the lowest distance metric, the highest accuracy, and consumes the least amount of power.

Figure 7:
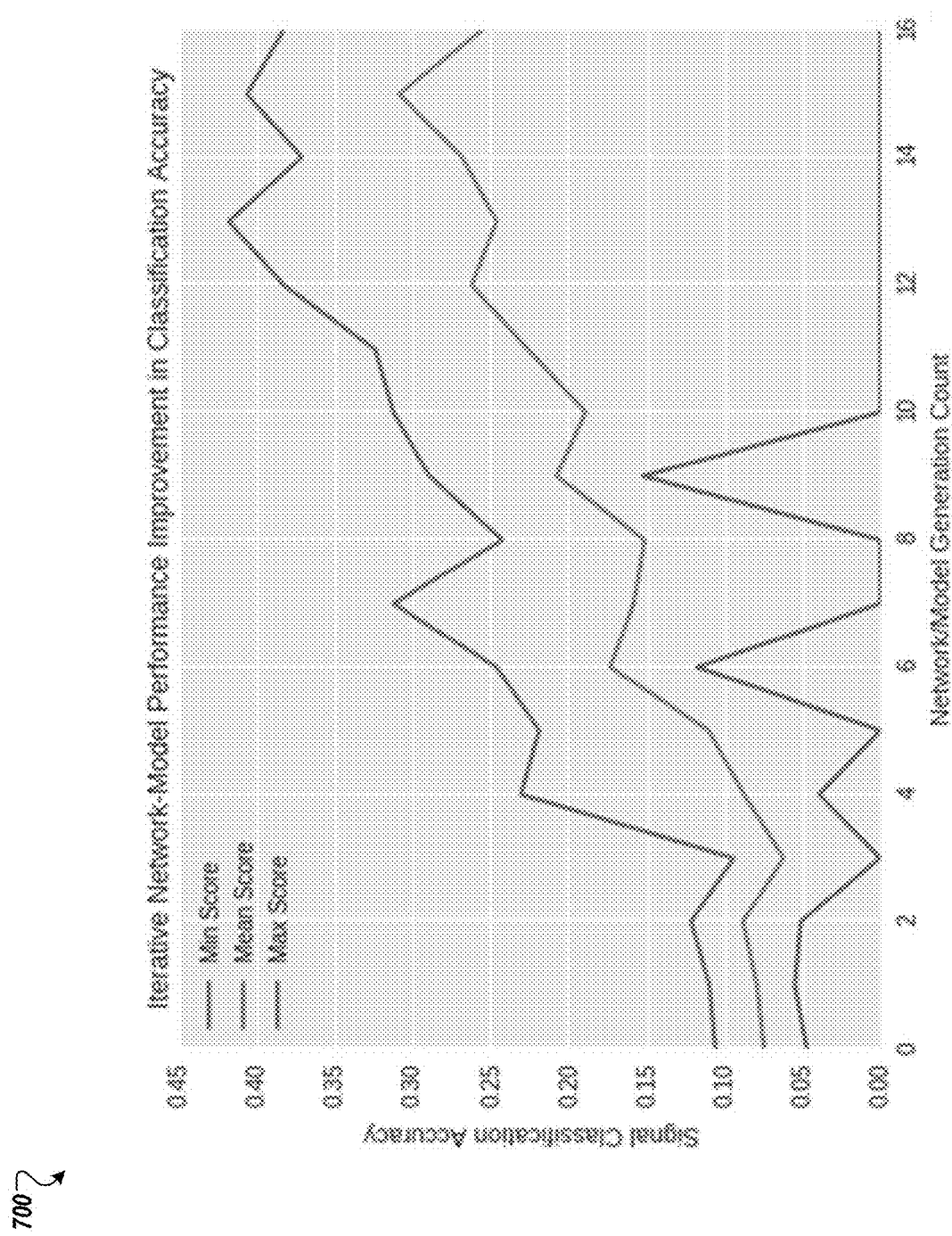
FIG. 7 illustrates an example of a radio signal processing system performance plot for a network-model graph search process.

FIG. 7 illustrates an example of a radio signal processing system performance plot 700 for a network-model graph search process. In this example, a radio signal processing system, such as radio signal processing system 200, is used to perform radio signal identification over 22 different emitter types. The radio signal processing system 200 is randomly generated and optimized using the system and method described previously with respect to FIGS. 1-6. The x-axis of the plot 700 illustrates the sequence of derived population generations of radio signal processing models evolving from the initial population in generation 0 to the final population in generation 16. The Y-axis illustrates the classification accuracy attained by networks within the population at each generation. The minimum, maximum, and average scores are shown where maximum represents the highest accuracy or best model. The mean represents the average score of all models in the population, and the minimum represents the worst performing model within each generation. This plot illustrates that the present disclosure can be realized on radio signal recognition tasks. In particular, the present disclosure can learn a compact network that most effectively achieves accurate recognition of radio emissions while minimizing power consumption of the network complexity. In addition, the present disclosure has been validated on several radio signal estimation and learned radio signal encoding/decoding tasks.

Figure 8:
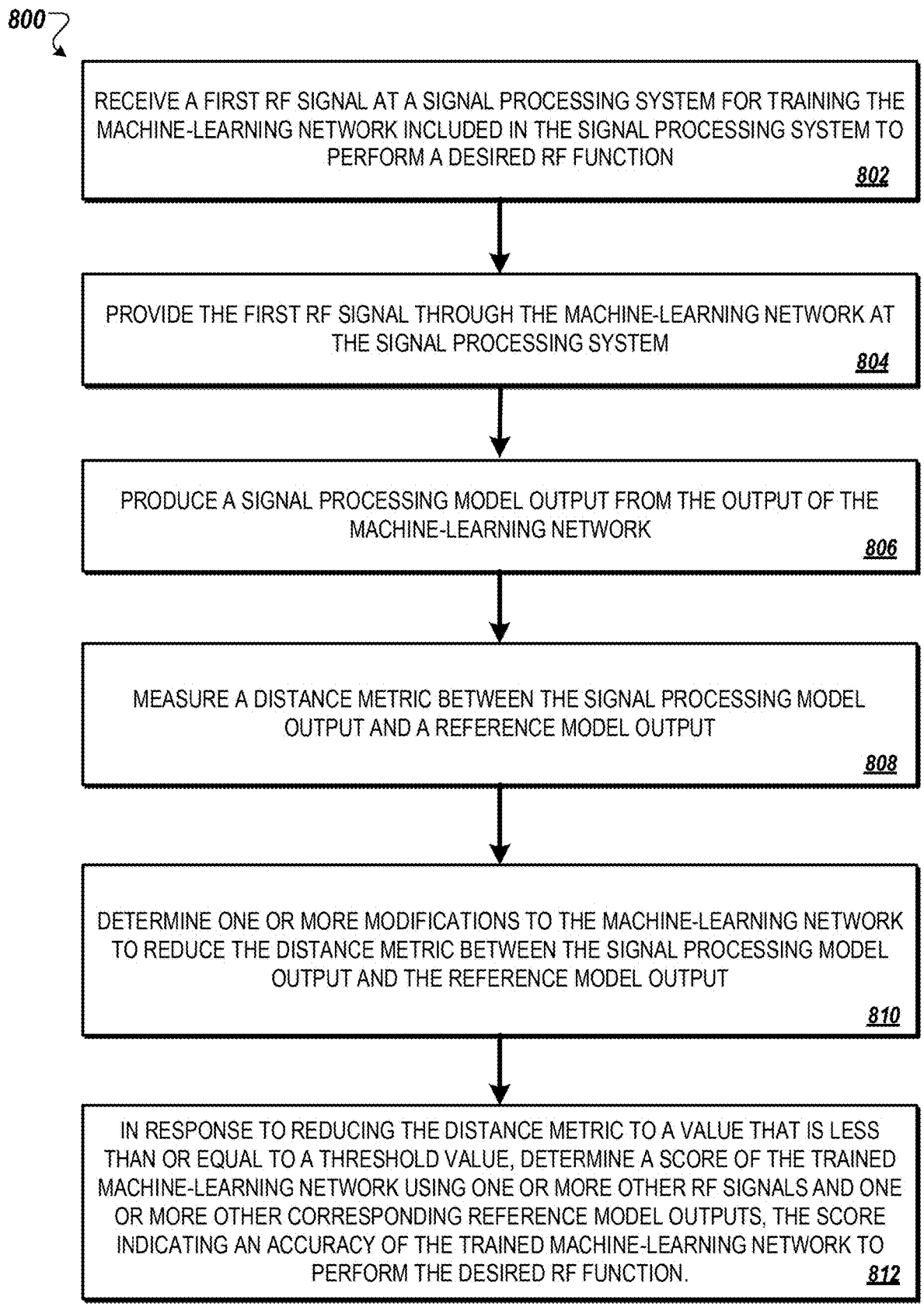
FIG. 8 is a flowchart illustrating an example method of training and evaluating the performance of a radio signal processing system.

FIG. 8 is a flowchart illustrating an example method 800 of training and evaluating the performance of a radio signal processing system. The method 800 can be utilized machine-learning networks, by using the training discussed in regards to FIGS. 2-5, above, or similar training techniques.

The method 800 includes receiving a first RF signal at a signal processing system for training the machine-learning network included in the signal processing system to perform a desired RF function (802). In some implementations, the first RF signal can include one or more radio signal from one or more antennas, sampled radio signals, one or more bits of information, and one or more bits of packet data to perform the desired RF function. For example, the desired RF function can be to convert the received RF signal to bits or generate a digital representation of the received analog RF signal.

The method 800 includes further includes providing the first RF signal through a machine-learning network at the signal processing system (804). As discussed with respect to FIG. 1, the first RF signal, such as radio samples, symbols, bits, packets, or other signal processing values are provided through each of the operations 103 through 111 of the radio signal processing system (e.g., the machine-learning network). The operations 103 through 111 process the first RF signal using operations such as, for example, large linear algebra vector operations and linear/non-linear transforms.

The method 800 further includes producing a signal processing model output from the output of the machine-learning network (806). For example, the output of the machine-learning network can include information about what signals are present (e.g. modulation types, wireless radio types, radar types, wireless interferes sources, impairment types occurring, etc.), their contents (information bits or symbols), or how they are arranged in the spectrum (e.g. their time, frequency, and mode of arrival).

The method 800 further includes measuring a distance metric between the signal processing model output and a reference model output (808). As described with respect to FIG. 5, a distance between the expected output and the signal processing model output is determined. For example, the distance between the expected output and the signal processing model output can indicate an error rate or performance level of the radio signal processing system.

The method further includes determining one or more modifications to the machine-learning network tem to reduce the distance metric between the signal processing model output and the reference model output (810). The modifications can include mutations and re-combinations (e.g., from crossover) to the signal processing system. In particular, the one or more mutations to the signal processing system includes removing and/or adding one or more operations and changing the hyper-parameters of the signal processing system. The frequency at which the mutations are performed may change or remain constant until the distance metric is met or falls below the threshold value. The re-combinations to the signal processing system includes combining one or more operations and hyper-parameters from two or more other signal processing systems to provide in the signal processing system.

The method 800 further includes in response to reducing the distance metric to a value that is less than or equal to a threshold value, determining a score of the trained machine-learning network using one or more other RF signals and one or more other corresponding reference model outputs, the score indicating an accuracy of the trained machine-learning network to perform the desired RF function (812). In particular, when the distance metric meets a value that is less than or equal to the threshold value, the trained signal processing model performance evaluation and scoring 518 can determine a classification accuracy of the trained machine-learning network. The trained SP model performance evaluation and scoring 518 can use other datasets to determine a score of the trained machine-learning network, such as other input RF signals, to perform the desired RF function (e.g., analog-to-digital converter, demodulation of signal, etc.).

Figure 9:
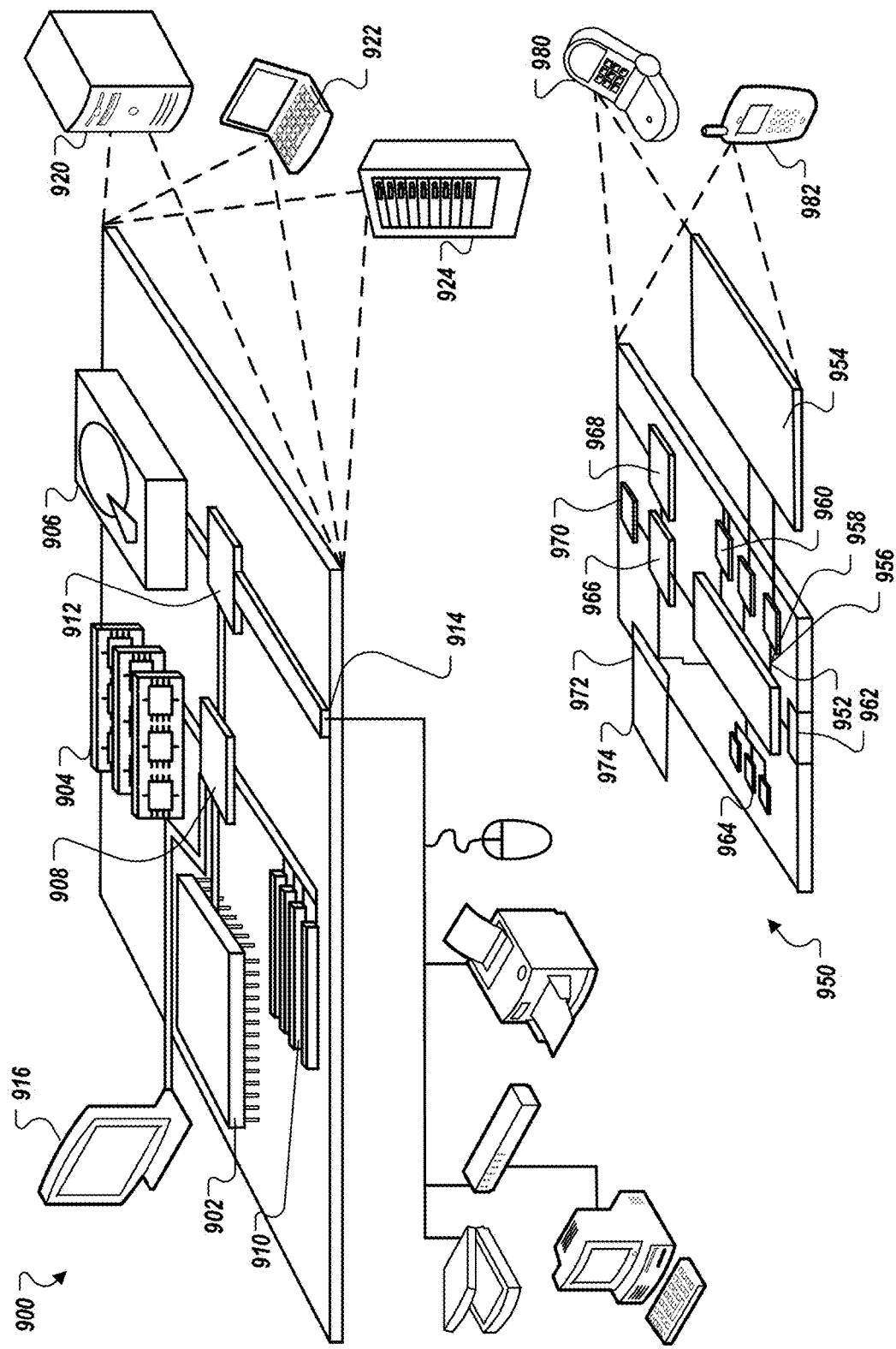
FIG. 9 is a diagram illustrating an example of a computing system that may be used to implement one or more components of a system that performs learned communication over RF channels.

FIG. 9 is a diagram illustrating an example of a computing system that may be used to implement one or more components of a system that can be trained to determine an optimal signal processing system that simulates an RF environment.

The computing system includes computing device 900 and a mobile computing device 950 that can be used to implement the techniques described herein. For example, one or more parts of an encoder machine-learning network system or a decoder machine-learning network system could be an example of the system 900 described here, such as a computer system implemented in any of the machine-learning networks, devices that access information from the machine-learning networks, or a server that accesses or stores information regarding the encoding and decoding performed by the machine-learning networks.

The computing device 900 is intended to represent various forms of digital computers, such as laptops, desktops, workstations, personal digital assistants, servers, blade servers, mainframes, and other appropriate computers. The mobile computing device 950 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 902 is a single-threaded processor. In some implementations, the processor 902 is a multi-threaded processor. In some implementations, the processor 902 is a quantum computer.

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 902), perform one or more methods, such as those described above. The instructions can also be stored by one or more storage devices such as computer or machine-readable mediums (for example, the memory 904, the storage device 906, or memory on the processor 902). The high-speed interface 908 manages bandwidth-intensive operations for the computing device 900, while the low-speed interface 912 manages lower bandwidth-intensive operations. Such allocation of functions is an example only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may include one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 952), perform one or more methods, such as those described above. The instructions can also be stored by one or more storage devices, such as one or more computer or machine-readable mediums (for example, the memory 964, the expansion memory 974, or memory on the processor 952). In some implementations, the instructions can be received in a propagated signal, for example, over the transceiver 968 or the external interface 962.

The mobile computing device 950 may communicate wirelessly through the communication interface 966, which may include digital signal processing circuitry where needed. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 968 using a radio frequency. In addition, short-range communication may occur, such as using a Bluetooth, Wi-Fi, or other such transceiver (not shown). In addition, a GPS (Global Positioning System) receiver module 970 may provide additional navigation and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure includes many specific implementation details, these should not be construed as limitations on the scope of any invention or of what may be claimed, but rather as descriptions of features, that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method comprising:
obtaining, by one or more processors, a radio frequency (RF) signal received at a cellular network device;
accessing, by the one or more processors, a plurality of candidate machine-learning models that are configured to perform one or more functions corresponding to error rate reduction in one or more cellular network devices;
providing, by the one or more processors, data corresponding to the obtained RF signal to each of the candidate machine-learning models of the plurality of candidate machine-learning models;
obtaining, by the one or more processors, an output from each of the candidate machine-learning models, wherein an output is generated by a respective candidate machine-learning model by processing the data corresponding to the obtained RF signal, and wherein the output corresponds to the error rate reduction;
determining, by the one or more processors, a score for each of the candidate machine-learning models based on the generated output;
identifying, by the one or more processors, a subset of the plurality of candidate machine-learning models whose respective scores satisfy a threshold value; and
deploying, by the one or more processors, the identified subset of candidate machine-learning models to one or more cellular network devices for performing the one or more functions.

2. The method of claim 1, wherein obtaining the RF signal received at the cellular network device comprises obtaining, by the one or more processors, a sampled RF signal in at least one of a time domain, a frequency domain, a time-frequency spectrogram domain, or a wavelet domain representation.

3. The method of claim 1, wherein accessing the plurality of candidate machine-learning models that are configured to perform the one or more functions corresponding to the error rate reduction in the one or more cellular network devices comprises accessing the plurality of candidate machine-learning models that are configured to simulate the one or more functions corresponding to the error rate reduction in the one or more cellular network devices.

4. The method of claim 3, wherein the one or more functions comprise translating the RF signal from an analog representation to a digital representation, transferring the RF signal from a carrier representation to a baseband representation, identifying the RF signal, demodulating the RF signal and extracting transmitted bits from the demodulated RF signal, and modelling wireless channel effects.

5. The method of claim 1, wherein each candidate machine-learning model of the plurality of candidate machine-learning models comprises a set of hyper-parameters and a set of operations, and the set of hyper-parameters comprise at least one of a number of output values, a non-linear activation applied to an output of a candidate machine-learning model, an input weight connectivity pattern, a dropout rate, a regularization parameter, a stochastic effect parameter, a learning rate of a gradient descent, or an additive noise term for the candidate machine-learning model.

6. The method of claim 1, wherein determining the score for each of the candidate machine-learning models based on the generated output comprises determining, by the one or more processors, a distance metric for each of the candidate machine-learning models by comparing the generated output from each of the candidate machine-learning models to a reference output for performing the one or more functions with the RF signal corresponding to the error rate reduction in the one or more cellular network devices.

7. The method of claim 6, wherein the threshold value corresponds to a particular performance criteria for the one or more cellular network devices, and
wherein identifying the subset of the plurality of candidate machine-learning models whose respective scores satisfy the threshold value comprises:
comparing, by the one or more processors, the distance metric for each of the candidate machine-learning models of the plurality of candidate machine-learning models to the threshold value for the particular performance criteria;
based on the comparison, determining, by the one or more processors, whether the distance metric for each of the candidate machine-learning models satisfies the threshold value for the particular performance criteria; and
in response to determining that the distance metric for the subset of the plurality of candidate machine-learning models satisfy the threshold value for the particular performance criteria, providing, by the one or more processors, the subset of the plurality of candidate machine-learning models for deployment.

8. The method of claim 7, wherein the particular performance criteria comprise at least one of a error rate, an f-divergence, or a cross entropy of bits.

9. The method of claim 1, further comprising:
obtaining, by the one or more processors, a candidate machine-learning model from the subset of the plurality of candidate machine-learning models whose scores satisfy the threshold value, wherein the generating comprises:
obtaining, by the one or more processors, a set of hyper-parameters and a set of operations for each candidate machine-learning models of the subset;
generating, by the one or more processors, a grouping of hyper-parameters that includes a combination of one or more of the set of hyper-parameters from each of the candidate machine-learning models of the subset;
generating, by the one or more processors, a grouping of operations that includes a combination of one or more of the set of operations from each of the candidate machine-learning models of the subset;
generating, by the one or more processors, the candidate machine-learning model using the grouping of the hyper-parameters and the grouping of the operations; and
determining, by the one or more processors, another distance metric of the candidate machine-learning model by evaluating the candidate machine-learning model with the one or more functions, wherein the other distance metric is less than each distance metric for the subset of the plurality of candidate machine-learning models.

10. The method of claim 1, wherein the cellular network device comprises at least one of a cellular telephone, a cellular base station, a wireless router, a wireless access point, or a software defined radio.

11. The method of claim 1, wherein accessing the plurality of candidate machine-learning models that are configured to perform the one or more functions corresponding to the error rate reduction in the one or more cellular network devices comprises accessing, by the one or more processors, the plurality of candidate machine-learning models that are configured to perform the one or more functions corresponding to the error rate reduction resulting from a processing function being performed in the one or more cellular network devices or a base station.

12. The method of claim 1, wherein determining the score for each of the candidate machine-learning models based on the generated output comprises determining, by the one or more processors, an error rate performance metric for each of the candidate machine-learning models based on the generated output.

13. A system comprising:
one or more computers and one or more storage devices storing instructions that are operable, when executed by the one or more computers, to cause the one or more computers to perform operations comprising:
obtaining, by one or more processors, a radio frequency (RF) signal received at a cellular network device;
accessing, by the one or more processors, a plurality of candidate machine-learning models that are configured to perform one or more functions corresponding to error rate reduction in one or more cellular network devices;
providing, by the one or more processors, data corresponding to the obtained RF signal to each of the candidate machine-learning models of the plurality of candidate machine-learning models;
obtaining, by the one or more processors, an output from each of the candidate machine-learning models, wherein an output is generated by a respective candidate machine-learning model by processing the data corresponding to the obtained RF signal, and wherein the output corresponds to the error rate reduction;
determining, by the one or more processors, a score for each of the candidate machine-learning models based on the generated output;
identifying, by the one or more processors, a subset of the plurality of candidate machine-learning models whose respective scores satisfy a threshold value; and
deploying, by the one or more processors, the identified subset of candidate machine-learning models to one or more cellular network devices for performing the one or more functions.

14. The system of claim 13, wherein obtaining the RF signal received at the cellular network device comprises obtaining, by the one or more processors, a sampled RF signal in at least one of a time domain, a frequency domain, a time-frequency spectrogram domain, or a wavelet domain representation.

15. The system of claim 13, wherein accessing the plurality of candidate machine-learning models that are configured to perform the one or more functions corresponding to the error rate reduction in the one or more cellular network devices comprises accessing the plurality of candidate machine-learning models that are configured to simulate the one or more functions corresponding to the error rate reduction in the one or more cellular network devices.

16. The system of claim 15, wherein the one or more functions comprise translating the RF signal from an analog representation to a digital representation, transferring the RF signal from a carrier representation to a baseband representation, identifying the RF signal, demodulating the RF signal and extracting transmitted bits from the demodulated RF signal, and modelling wireless channel effects.

17. The system of claim 13, wherein each candidate machine-learning model of the plurality of candidate machine-learning models comprises a set of hyper-parameters and a set of operations, and the set of hyper-parameters comprise at least one of a number of output values, a non-linear activation applied to an output of a candidate machine-learning model, an input weight connectivity pattern, a dropout rate, a regularization parameter, a stochastic effect parameter, a learning rate of a gradient descent, or an additive noise term for the candidate machine-learning model.

18. The system of claim 13, wherein determining the score for each of the candidate machine-learning models based on the generated output comprises determining, by the one or more processors, a distance metric for each of the candidate machine-learning models by comparing the generated output from each of the candidate machine-learning models to a reference output for performing the one or more functions with the RF signal corresponding to the error rate reduction in the one or more cellular network devices.

19. The system of claim 18, wherein the threshold value corresponds to a particular performance criteria for the one or more cellular network devices, and
wherein identifying the subset of the plurality of candidate machine-learning models whose respective scores satisfy the threshold value comprises:
comparing, by the one or more processors, the distance metric for each of the candidate machine-learning models of the plurality of candidate machine-learning models to the threshold value for the particular performance criteria;
based on the comparison, determining, by the one or more processors, whether the distance metric for each of the candidate machine-learning models satisfies the threshold value for the particular performance criteria; and
in response to determining that the distance metric for the subset of the plurality of candidate machine-learning models satisfy the threshold value for the particular performance criteria, providing, by the one or more processors, the subset of the plurality of candidate machine-learning models for deployment.

20. A non-transitory computer-readable medium storing software comprising instructions executable by one or more computers which, upon such execution, cause the one or more computers to perform operations comprising:
obtaining, by one or more processors, a radio frequency (RF) signal received at a cellular network device;
accessing, by the one or more processors, a plurality of candidate machine-learning models that are configured to perform one or more functions corresponding to error rate reduction in one or more cellular network devices;
providing, by the one or more processors, data corresponding to the obtained RF signal to each of the candidate machine-learning models of the plurality of candidate machine-learning models;
obtaining, by the one or more processors, an output from each of the candidate machine-learning models, wherein an output is generated by a respective candidate machine-learning model by processing the data corresponding to the obtained RF signal, and wherein the output corresponds to the error rate reduction;

determining, by the one or more processors, a score for each of the candidate machine-learning models based on the generated output;
identifying, by the one or more processors, a subset of the plurality of candidate machine-learning models whose respective scores satisfy a threshold value; and
deploying, by the one or more processors, the identified subset of candidate machine-learning models to one or more cellular network devices for performing the one or more functions.

* * * * *